(12) United States Patent
Hoshi et al.

(10) Patent No.: US 11,993,248 B2
(45) Date of Patent: May 28, 2024

(54) METHOD FOR CONTROLLING SERIES HYBRID VEHICLE, AND SERIES HYBRID VEHICLE

(71) Applicant: Nissan Motor Co., Ltd., Yokohama (JP)

(72) Inventors: Kiyoshi Hoshi, Kanagawa (JP); Yohei Nakamura, Kanagawa (JP); Azusa Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 268 days.

(21) Appl. No.: 17/628,915

(22) PCT Filed: Jul. 29, 2020

(86) PCT No.: PCT/JP2020/029114
§ 371 (c)(1),
(2) Date: Jan. 21, 2022

(87) PCT Pub. No.: WO2022/024273
PCT Pub. Date: Feb. 3, 2022

(65) Prior Publication Data
US 2022/0363239 A1    Nov. 17, 2022

(51) Int. Cl.
*B60W 20/17* (2016.01)
*B60W 10/08* (2006.01)

(52) U.S. Cl.
CPC ............ *B60W 20/17* (2016.01); *B60W 10/08* (2013.01); *B60W 2510/0638* (2013.01); *B60W 2510/083* (2013.01); *B60W 2710/083* (2013.01)

(58) Field of Classification Search
CPC ......... B60W 10/08; B60W 2510/0638; B60W 2510/083; B60W 2710/083; B60W 2030/206; B60W 2510/0676; B60W 2510/081; B60W 2520/10; B60W 2530/12; B60W 2540/10; B60W 2540/12;
(Continued)

(56) References Cited

U.S. PATENT DOCUMENTS

2003/0098185 A1* 5/2003 Komeda ............... B60W 10/08
                                                      903/917
2022/0055609 A1* 2/2022 Mizuguchi .............. B60L 50/16

FOREIGN PATENT DOCUMENTS

JP    2009-67216 A    4/2009
JP    2012-86735 A    5/2012
JP    2018-135045 A   8/2018

* cited by examiner

*Primary Examiner* — Yi-Kai Wang
(74) *Attorney, Agent, or Firm* — Global IP Counselors, LLP

(57) ABSTRACT

A control method controls a series hybrid vehicle in which a drive motor and an internal combustion engine are supported in a vehicle body via a plurality of mount members in an integrated state. The control method using a controller generates electric power using an electric power generation motor, and drives the electric power generation motor using motive power of the internal combustion engine. The control method drives a drive wheel with the drive motor using the generated electric power, and causes the drive motor to generate regenerative torque during deceleration. In the control method, the regenerative torque is generated by the drive motor such that an upper limit of the regenerative torque is restricted to a magnitude at which an engine rotational speed where resonance occurs on the vehicle body floor.

9 Claims, 8 Drawing Sheets

(58) Field of Classification Search
CPC . B60W 2710/0644; B60W 2710/0666; B60W 2710/081; B60W 2710/182; B60W 10/06; B60W 10/184; B60W 10/18; B60W 20/11; B60W 20/14; B60W 30/18127; B60W 30/1882; B60W 40/12; B60K 6/40; B60K 6/405; B60K 6/46; Y02T 10/62
USPC .......................................................... 701/22
See application file for complete search history.

METHOD FOR CONTROLLING SERIES HYBRID VEHICLE, AND SERIES HYBRID VEHICLE

CROSS-REFERENCE TO RELATED APPLICATIONS

This application is a U.S. national stage application of International Application No. PCT/JP2020/029114, filed on Jul. 29, 2020.

BACKGROUND

Technical Field

The present invention relates to a method for controlling a series hybrid vehicle, and to a series hybrid vehicle.

Background Information

JP 2018-135045 A discloses a hybrid vehicle comprising an internal combustion engine and a drive motor as motive power sources, wherein, in order to reduce floor vibration generated due to vibration of the internal combustion engine being transmitted to a vehicle compartment floor via an engine mount, a control for causing the drive motor to generate counter torque is performed.

SUMMARY

In series hybrid vehicles, configurations are known in which an internal combustion engine and a drive motor are installed in a vehicle in an integrated state such that a casing of the drive motor is connected to the internal combustion engine. In this configuration, when the drive motor generates torque, an engine mount supporting the internal combustion engine is compressed by an associated reactive force, and a spring constant of the engine mount increases. When the spring constant of the engine mount increases, an engine-rotational-speed resonant rotational speed region in which floor vibration becomes a problem is offset toward a high-rotational-speed side. In this case, an upper limit of the engine rotational speed is restricted in order to, inter alia, promote warming-up of an exhaust purification catalyst; when the internal combustion engine is operating at a relatively low rotational speed, there is a concern that the engine rotational speed could enter the resonant rotational speed region. Specifically, there is a concern that resonance could be generated due to combustion excitation force of the internal combustion engine and floor vibration could increase.

The aforementioned document does not disclose suppressing any increase in floor vibration produced due to the reason described above. Thus, an object of the present invention is to suppress any increase in floor vibration produced due to a resonant rotational speed region, which originates from generation of torque by a drive motor, being offset toward a high-rotational-speed side.

According to one aspect of the present invention, there is provided a control method for controlling a series hybrid vehicle in which a drive motor and an internal combustion engine are supported in a vehicle body via a plurality of mount members in an integrated state, the method being one in which a controller: causes an electric power generation motor to generate electric power, the electric power generation motor being driven by motive power of the internal combustion engine; actuates the drive motor by using the generated electric power and drives drive wheels; and causes the drive motor to generate regenerative torque that corresponds to a deceleration request during deceleration. In this control method, the regenerative torque is generated by the drive motor such that an upper limit of the regenerative torque is restricted to a magnitude at which a floor vibration generation region, which is an engine rotational speed region where resonance occurs on the vehicle body floor and is determined based on the upper limit of the regenerative torque, is lower than an engine rotational speed of the internal combustion engine when the electric power generation motor generates the electric power in a state where the regenerative torque is generated.

BRIEF DESCRIPTION OF THE DRAWINGS

Referring now to the attached drawings which form a part of this original disclosure.

DETAILED DESCRIPTION OF EMBODIMENTS

An embodiment of the present invention is described below with reference to the accompanying drawings.

Figure 1:
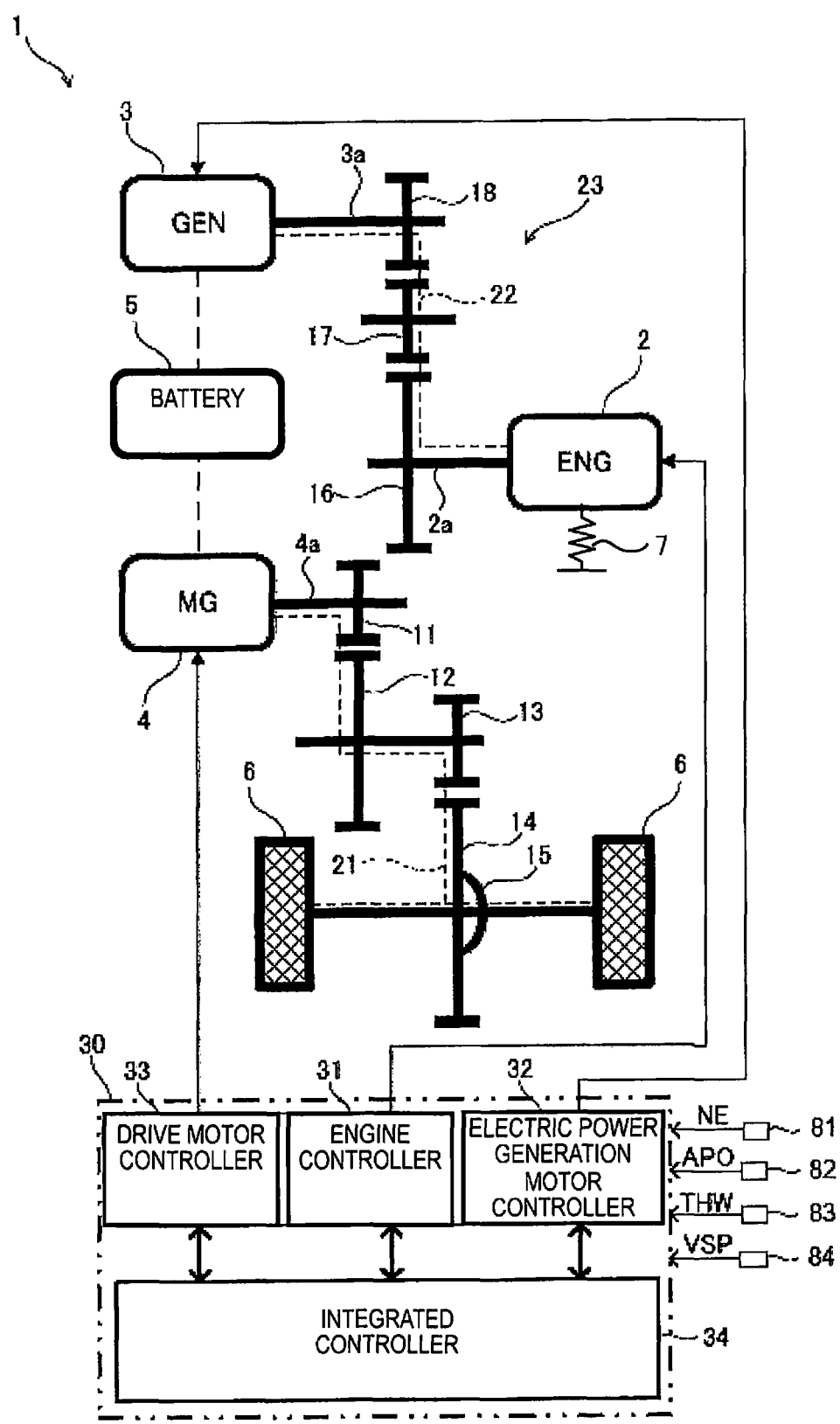
FIG. 1 is a schematic structural view showing main sections of a vehicle.

FIG. 1 is a schematic structural view showing main sections of a vehicle 1. The vehicle 1 is provided with an internal combustion engine 2 (ENG in the drawing), an electric power generation motor 3 (GEN in the drawing), a drive motor 4 (MG in the drawing), a battery 5, and drive wheels 6. The drive wheels 6 are front wheels of the vehicle 1. Specifically, the vehicle 1 is a front-wheel-drive vehicle.

The internal combustion engine 2 may be either a gasoline engine or a diesel engine. The electric power generation motor 3 is driven by motive power of the internal combustion engine 2 whereby electric power is generated. The drive motor 4 is driven by electric power from the battery 5 and drives the drive wheels 6. The drive motor 4 also has a "regenerative function," in which the drive motor 4 co-rotates with the drive wheels 6 during deceleration, etc., whereby deceleration energy is regenerated as electric power. The battery 5 is charged by the electric power generated by the electric power generation motor 3 and the electric power regenerated by the drive motor 4.

The vehicle 1 has a first motive power transmission path 21 and a second motive power transmission path 22. The first motive power transmission path 21 transmits motive power between the drive motor 4 and the drive wheels 6. The second motive power transmission path 22 transmits motive power between the internal combustion engine 2 and the electric power generation motor 3. The first motive power transmission path 21 and the second motive power transmission path 22 are configured to be mutually independent of each other; specifically, motive power is not transmitted from the first motive power transmission path 21 to the second motive power transmission path 22 or vice versa.

The first motive power transmission path 21 is configured to have: a first reduction gear 11 provided to a rotating shaft 4a of the drive motor 4; a second reduction gear 12 that meshes with the first reduction gear 11; a third reduction gear 13 that is provided coaxially with the second reduction gear 12 and that meshes with a differential gear 14; and the differential gear 14, which is provided to a differential case 15.

The second motive power transmission path 22 is configured to have a fourth reduction gear 16 provided to an output shaft 2a of the internal combustion engine 2, a fifth reduction gear 17 that meshes with the fourth reduction gear 16, and a sixth reduction gear 18 that is provided to a rotating shaft 3a of the electric power generation motor 3 and that meshes with the fifth reduction gear 17.

Neither of the first motive power transmission path 21 and the second motive power transmission path 22 is provided with an element for obstructing transmission of motive power. Specifically, each of the first motive power transmission path 21 and the second motive power transmission path 22 is configured in a state in which motive power is always transmitted.

The second motive power transmission path 22 constitutes a motive power transmission path of a motive power transmission system 23. The motive power transmission system 23 includes the internal combustion engine 2 and the electric power generation motor 3 and is configured such that motive power is transmitted from the electric power generation motor 3 to the internal combustion engine 2 during motoring of the internal combustion engine 2.

The vehicle 1 is furthermore provided with a controller 30 that serves as a control unit. The controller 30 is configured to have a vehicle dynamics controller 41 and a body control module 42 (described later), in addition to an engine controller 31 that controls the internal combustion engine 2, an electric-power-generating-motor controller 32 that controls the electric power generation motor 3, a drive-motor controller 33 that controls the drive motor 4, and a integrated controller 34 that consolidates the control of the vehicle 1.

The engine controller 31 is configured from a microcomputer provided with a central processing unit (CPU), a read-only memory (ROM), a random access memory (RAM), and an input/output interface (I/O interface). The same applies to the electric-power-generating-motor controller 32, the drive-motor controller 33, and the integrated controller 34. The engine controller 31, the electric-power-generating-motor controller 32, and the drive-motor controller 33 are communicably connected to each other by a CAN standard bus via the integrated controller 34.

Signals from a variety of sensors and switches are inputted to the controller 30, the sensors and switches including a rotational speed sensor 81 for detecting a rotational speed NE of the internal combustion engine 2, an accelerator position sensor 82 for detecting an accelerator position APO that indicates the amount by which an accelerator pedal is depressed, a water temperature sensor 83 for detecting a water temperature THW of the internal combustion engine 2, and a vehicle speed sensor 84 for detecting a vehicle speed VSP. These signals are inputted to the integrated controller 34 either directly or via the engine controller 31 or another controller. The vehicle speed VSP may be inputted directly from the vehicle speed sensor 84 to the integrated controller 34 by way of the vehicle dynamics controller (VDC) 41.

The vehicle 1 constitutes a series hybrid vehicle that uses electric power from the electric power generation motor 3, which is driven by the motive power from the internal combustion engine 2 and which generates electric power, to drive the drive wheels 6 using the drive motor 4.

In FIG. 1, the internal combustion engine 2 and the drive motor 4 are set apart from one another in order to facilitate understanding of the motive power transmission path; in actuality, however, a casing accommodating the drive motor 4 is linked and integrated with the internal combustion engine 2 via a gear box as the motive power transmission path 22. The internal combustion engine 2 and the drive motor 4 are elastically supported in the vehicle 1 via an engine mount 7 and a motor mount (not shown) in an integrated state.

A driver drives the vehicle 1 by performing operations for switching between a plurality of shift positions and drive modes. Shift position switching is carried out by operating a shifter (not shown). The shift positions that can be selected by the shifter include a park position (P), a reverse position (R), a neutral position (N), a first advancement position (D), and a second advancement position (B). In cases where it is not necessary to distinguish between D and B, these two shift positions may be collectively referred to as an advancement position.

Drive mode switching is carried out by operating a drive mode switch (not shown). The drive modes include N mode, S mode, and ECO mode. In N mode, acceleration is carried out by operating an accelerator pedal (normal regeneration mode). Therefore, in N mode, regenerative deceleration is not carried out while the accelerator pedal is being operated, and regenerative deceleration is carried out when the accelerator pedal is in an off state. In S mode and ECO mode, acceleration and regenerative deceleration are carried out by operating the accelerator pedal (one-pedal modes). ECO mode is more suitable for fuel-efficient driving than S mode.

Depending on a combination with the selected drive mode in the vehicle 1, D constitutes ND mode in combination with N mode, SD mode in combination with S mode, or ECO-D mode in combination with ECO mode. Similarly, depending on the combination with the selected drive mode, B constitutes NB mode, SB mode, or ECO-B mode.

The deceleration rate of the vehicle 1 caused by regeneration in the drive motor 4 is higher in the B position than in the D position. Specifically, a target deceleration rate is set so as to be higher in the B position than in the D position. A higher deceleration rate implies that the degree of deceleration is greater (absolute value of the deceleration rate is higher). The same applies to the target deceleration rate. An absolute value of regenerative electric power produced by the drive motor 4 is higher in the B position than in the D position, resulting in a higher deceleration rate. In addition, the regenerative electric power produced by the drive motor 4 is greater in both SD mode and ECO-D mode than in ND mode, resulting in a higher deceleration rate. In the descriptions given below, N mode is referred to as a normal regeneration mode, and S mode and ECO mode are referred to as enhanced regeneration modes.

A control executed by the integrated controller 34 during regenerative deceleration is described next.

In the present embodiment, cooperative regenerative braking is executed when the vehicle 1 is decelerating. As is well known, cooperative regenerative braking is a control in which a target braking force established in accordance with, inter alia, an amount by which the brake pedal is operated by the driver is obtained by combining a braking force of a friction brake that operates through hydraulic pressure and a braking force generated through regeneration in the drive motor 4. In the present embodiment, the target braking force basically is met by the braking force produced by the drive motor 4, but when the braking force produced thereby is insufficient to reach the target braking force, the friction brake is operated. Specifically, during cooperative regenerative braking, regenerative torque of the drive motor 4 is greater than regenerative torque produced through coasting travel.

Figure 2:
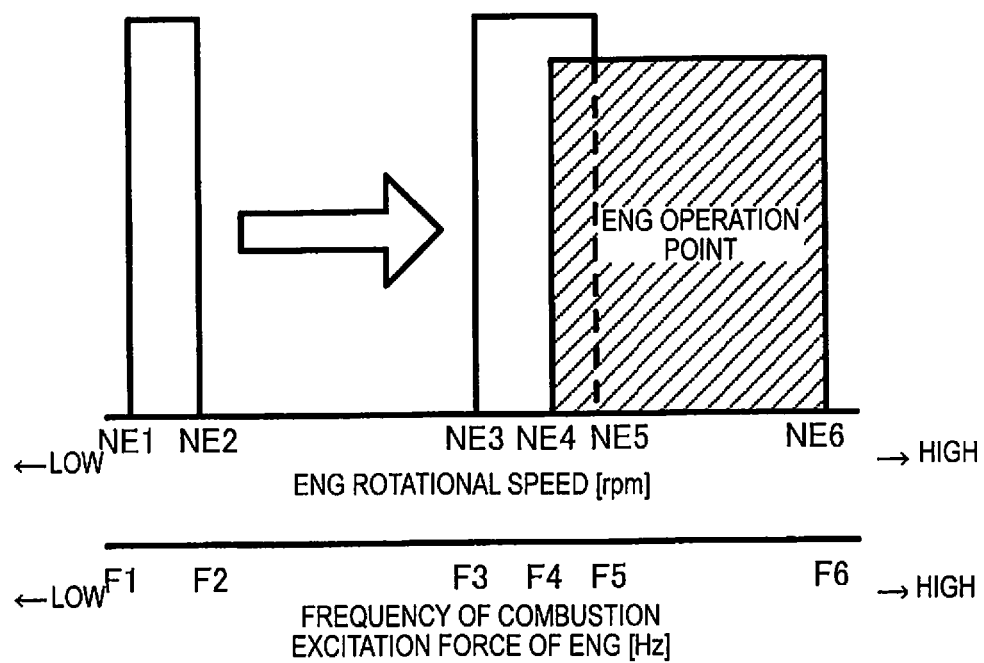
FIG. 2 is a diagram for elucidating a mechanism by which floor vibration increases.

When the drive motor 4 and the internal combustion engine 2 are integrated and elastically supported in the vehicle body as described above, if the drive motor 4 generates torque, the engine mount 7 is compressed by an associated reactive force. Due to the engine mount 7 being compressed, a spring constant (coefficient of elasticity) of the engine mount 7 increases. As a result, a characteristic frequency of a single-degree-of-freedom system formed by the internal combustion engine 2 and the engine mount 7 increases. Typically, in order to suppress "floor vibration," the spring constant of the engine mount 7 is set such that the characteristic frequency of the single-degree-of-freedom system formed by the internal combustion engine 2 and the engine mount 7 is below the frequency band of vibration during operation of the internal combustion engine 2. However, if the engine mount 7 is compressed by reactive force of the torque of the drive motor 4 and the characteristic frequency increases as described above, the characteristic frequency could fall within the frequency band of vibration during operation of the internal combustion engine 2. FIG. 2 illustrates this situation.

The horizontal axes in FIG. 2 represent an engine rotational speed and a frequency of a combustion excitation force of the internal combustion engine. In FIG. 2, for example, the combustion excitation force is represented as F1 when the engine rotational speed is NE1.

A rotational speed region from the engine rotational speed NE1 to an engine rotational speed NE2 is a region in which resonance is produced by the combustion excitation force in a state where the drive motor 4 is not generating torque (also referred to as a resonant rotational speed region below). A rotational speed region from an engine rotational speed NE5 to an engine rotational speed NE6 is a region that can be obtained when the internal combustion engine 2 is operating in order to generate electric power (also referred to as an engine operation point region below).

When the drive motor 4 is not generating torque, the resonant rotational speed region is separated from the engine operation point region as shown in FIG. 2, and therefore resonance is not produced even when the internal combustion engine operates in order to generate electric power. Because resonance is not produced, floor vibration does not become a problem. "Floor vibration becoming a problem" refers to a situation where the floor vibration exceeds a permissible value. The permissible value is set in a discretionary manner in accordance with, inter alia, the specifications of the vehicle 1 to which the present embodiment is applied.

When the drive motor 4 generates torque, the resonant rotational speed region shifts toward higher rotation as mentioned above. As shown in FIG. 2, when the resonant rotational speed region shifts to NE3-NE5, an overlap portion of the resonant rotational speed region and the engine operation point region is produced. Specifically, resonance is produced due to the combustion excitation force of the internal combustion engine 2 operating in order to generate electric power, whereby floor vibration becomes a problem.

There is no problem if the resonant rotational speed region shifts toward higher rotation but does not overlap the engine operation point region. However, because the amount of regenerative torque generated by the drive motor 4 increases when cooperative regenerative braking is executed, it is highly likely that floor vibration caused by resonance will become a problem.

Displacing the engine operation point region toward higher rotation is considered to be a measure against resonance. Specifically, when the resonant rotational speed region shifts to NE3-NE5 shown in FIG. 2 due to cooperative regenerative braking, the lower limit of the engine operation point region is restricted to a rotational speed higher than NE5.

Figure 3:
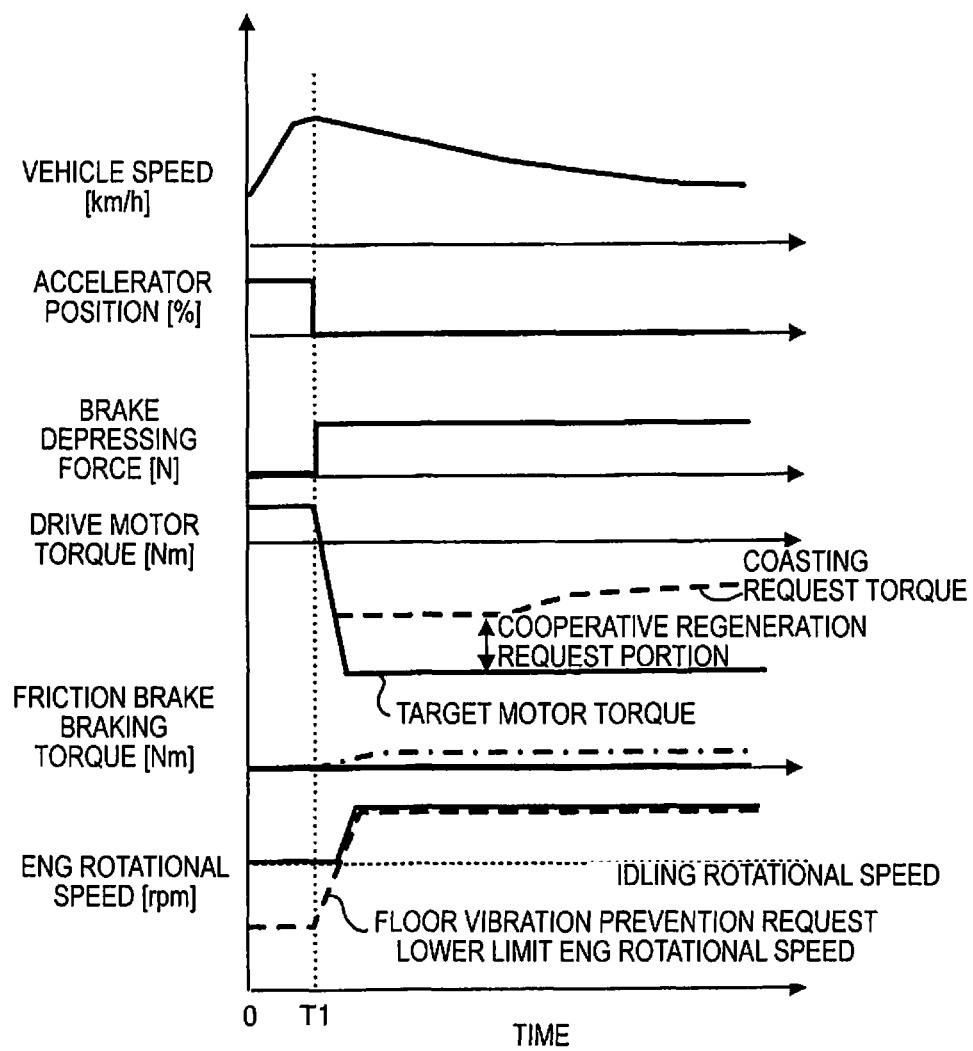
FIG. 3 is a timing chart for a case where a lower limit of an engine operation point region is restricted during cooperative regenerative braking.

FIG. 3 is a timing chart for a case where the lower limit of the engine operation point region is restricted during cooperative regenerative braking.

In FIG. 3, the vehicle 1 travels in a state where the accelerator pedal is depressed until a timing T1, the accelerator pedal is released at the timing T1, and deceleration is started upon the brake pedal being depressed.

When deceleration starts, the torque of the drive motor (drive motor torque in the drawing) changes from positive to negative, and generation of electric power through regeneration starts. In this instance, the torque (solid line in the drawing) is obtained by adding cooperative regenerative torque to coasting regenerative torque (dashed line in the drawing). In cases where the target braking force that corresponds to brake depressing force cannot be realized even if the cooperative regenerative torque is added, the lacking braking force is compensated for by the friction brake (single-dot chain line in the drawing).

The lower limit of the engine rotational speed is raised in order to suppress any increase in floor vibration caused by cooperative regenerative braking. For example, in cases where the internal combustion engine 2 has operated at an idling rotational speed in order to generate electric power, the lower limit of the engine rotational speed is raised in accordance with a decrease (negative-direction increase) in the drive motor torque.

This makes it possible to increase the lower limit in the engine operation point region to a greater extent than in the resonant rotational speed region, therefore making it possible to suppress any increase in floor vibration.

However, in series hybrid vehicles, there are cases where the upper limit of the engine rotational speed of the internal combustion engine 2 is restricted during power generation. For example, during execution of a catalyst warm-up mode for warming up an exhaust purification catalyst immediately after startup of a hybrid system, and during execution of a recovery mode for increasing the temperature of the exhaust purification catalyst for which the temperature has decreased during travel, the upper limit of the engine rotational speed is restricted. In addition, when the vehicle is traveling at low vehicle speed in cases where the internal combustion engine 2 is operating, there is a concern that an amount of heat propagating from the internal combustion engine 2 to surrounding devices could increase. Even during execution of a heat protection mode for suppressing this increase, the upper limit of the engine rotational speed is restricted.

There is a concern that, due to the upper limit of the engine rotational speed being restricted, it could become impossible to increase the lower limit in the engine operation point region to a greater extent than the upper limit in the resonant rotational speed region. Specifically, there is a concern that it could become impossible to increase the engine rotational speed above the resonant rotational speed region, in which floor vibration becomes a problem.

In the present embodiment, by executing the control described above, both cooperative regenerative braking and suppression of floor vibration are achieved even in cases where the upper limit of the engine rotational speed is restricted.

Figure 4:
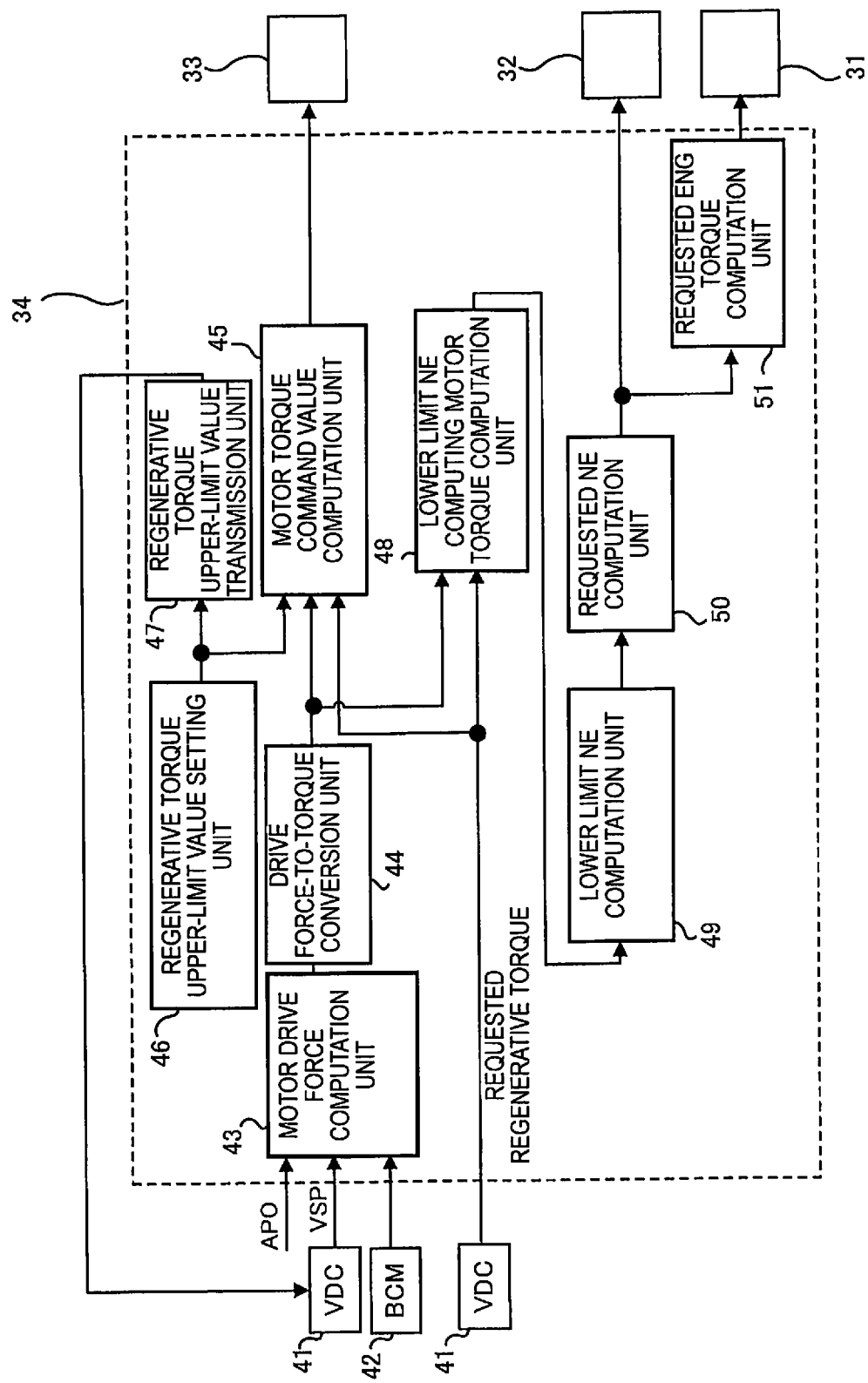
FIG. 4 is a block diagram showing a processing function for executing cooperative regenerative diagram.

FIG. 4 is a block diagram showing a processing function for executing cooperative regenerative braking in the controller 30 (specifically the integrated controller 34). The integrated controller 34 has a motor drive force computation unit 43, a conversion unit 44, a motor torque command value computation unit 45, a regenerative torque upper limit value setting unit 46, a regenerative torque upper limit value transmission unit 47, a lower limit rotational speed computation motor torque computation unit 48, a lower limit rotational speed computation unit 29, a requested rotational speed computation unit 50, and a requested engine torque computation unit 51. These computation units indicate computation processing functions, and do not refer to physical configurations.

The motor drive force computation unit 43 computes a requested drive force that corresponds to the accelerator position based on of a current drive mode inputted from the accelerator position APO, the vehicle speed VSP, and a BCM 42. The BCM 42 is a controller (body control module) that controls operation of electrical components. The requested drive force is computed by, e.g., creating in advance a map in which it is possible to search for drive force according to the accelerator position APO and the vehicle speed VSP in each drive mode, storing the map in the integrated controller 34, and searching the map based on of inputted signals.

The conversion unit 44 converts the requested drive force to torque (requested torque) of the drive motor 4. The requested torque obtained thereby is inputted to the motor torque command value computation unit 45 and the lower limit rotational speed computation motor torque computation unit 48.

The regenerative torque upper limit value setting unit 46 sets a regenerative torque upper limit value, which is an upper limit value of the regenerative torque of the drive motor 4 for preventing floor vibration, through the method described below.

Method for Setting Regenerative Torque Upper Limit Value

The vibration produced by the combustion excitation force of the internal combustion engine 2 is handled as vibration of a single-degree-of-freedom system, where the internal combustion engine 2 is a rigid body having a mass m, and the engine mount 7 is an elastic body having a spring constant k. This system is handled as a single-degree-of-freedom system of the engine mount 7 alone without consideration for the motor mount that elastically supports the drive motor 4, which is integrated with the internal combustion engine 2, because the motor mount is installed at a position set apart from the internal combustion engine 2 and therefore need not be included when considering the vibration of the internal combustion engine 2.

A combustion excitation force frequency fe during operation at an upper limit engine rotational speed Ru, which is the lowest engine rotational speed among engine rotational speeds in cases where the upper limit is restricted through, inter alia, the catalyst warm-up mode described above, is represented by expression (1). In the present embodiment, the combustion excitation force frequency following a 1.5 rotation is calculated with the internal combustion engine 2 being a three-cylinder engine.

Expression 1

$$fe[\text{Hz}] = \frac{Ru}{60} * 1.5 \tag{1}$$

A characteristic frequency of the single-degree-of-freedom system is represented by expression (2).

Expression 2

$$f[\text{Hz}] = \frac{1}{2\pi}\sqrt{\frac{k}{m}} \tag{2}$$

A target characteristic frequency ft, which is a frequency in a case where the floor vibration is at a permissible level, is represented by expression (3).

Expression 3

$$ft[\text{Hz}] = f*\eta \tag{3}$$

The symbol $\eta$ in expression (3) is a coefficient for releasing the characteristic frequency f to a permissible level of floor vibration. This coefficient $\eta$ can be set with discretion.

If the combustion excitation force coefficient fe is less than the target characteristic frequency f, it is considered that floor vibration is at a permissible level. As such, expression (1) is greater than expression (3), and when the spring constant k is calculated in this instance, the relationship in expression (4) is formed.

Expression 4

$$k < m\left(\frac{Ru * \pi}{30\eta}\right)^2 \tag{4}$$

The regenerative torque upper limit value setting unit 46 calculates the regenerative torque upper limit value by using the spring constant k obtained in this manner. Specifically, this value is calculated according to the method shown in FIG. 5.

Figure 5:
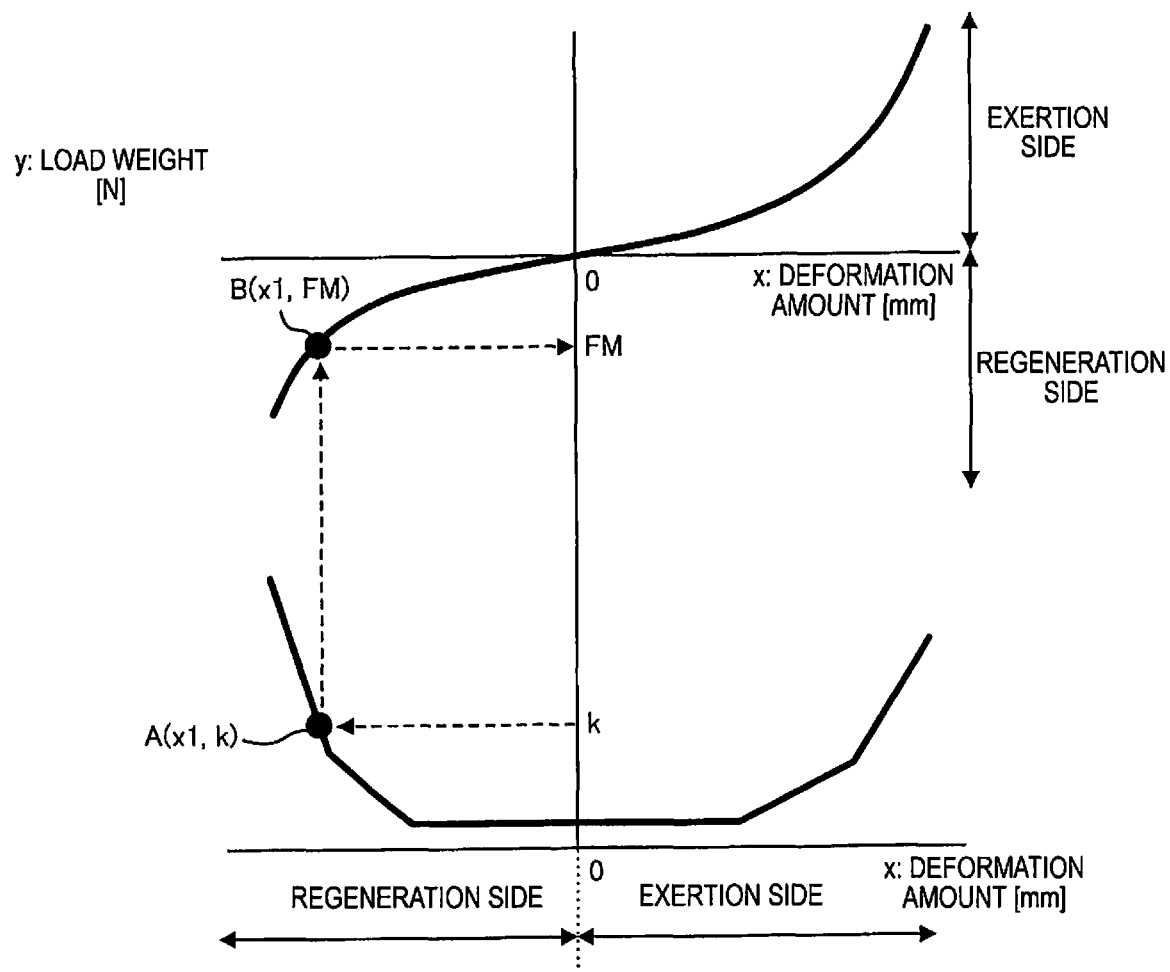
FIG. 5 is a diagram for elucidating a method for calculating an upper limit value of regenerative torque.

FIG. 5 shows characteristics of the spring constant of the engine mount 7 measured in advance. The upper section in FIG. 5 shows the relationship between a load acting on the engine mount 7 and an amount of deformation (also referred to as a compression amount) of the engine mount 7. The lower section of FIG. 5 shows the relationship between the amount of deformation of the engine mount 7 and the spring constant.

First, the value of (deformation amount)×1 when the spring constant established according to expression (4) is employed is calculated from the characteristic diagram shown in the lower section of FIG. 5. Next, the load FM when (deformation amount)×1 is employed is calculated from the characteristic diagram shown in the upper section of FIG. 5. A result of converting the load FM obtained in this manner to torque serves as the regenerative torque upper limit value.

The description now returns to the explanation of FIG. 4.

The regenerative torque upper limit value set by the regenerative torque upper limit value setting unit 46 is inputted to the motor torque command value computation unit 45 and the regenerative torque upper limit value transmission unit 47. The regenerative torque upper limit value transmission unit transmits the regenerative torque upper limit value to the VDC 41.

The VDC 41 controls the hydraulic pressure of the friction brake such that a braking force that corresponds to the difference between the regenerative torque upper limit value and a requested regenerative torque (described later) is supplemented by the friction brake.

In addition to the regenerative torque upper limit value and the requested torque corresponding to the accelerator position, a requested regenerative torque that corresponds to the brake operation amount is also inputted from the VDC 41 to the motor torque command value computation unit 45. The motor torque command value computation unit 45 calculates, as a motor torque command value, a value obtained by restricting an overall regenerative torque using the regenerative torque upper limit value, the overall regenerative torque having been established according to the requested torque corresponding to the accelerator position and the requested regenerative torque corresponding to the brake operation amount, and inputs the motor torque command value to the drive motor controller 33.

In addition to the requested torque corresponding to the accelerator position, the requested regenerative torque corresponding to the brake operation amount is also inputted from the VDC 41 to the lower limit rotational speed computation motor torque computation unit 48. The lower limit rotational speed computation motor torque computation unit 48 employs, as a lower limit rotational speed computation motor torque for computing the lower limit rotational speed of the internal combustion engine 2, an overall regenerative torque obtained by adding the requested regenerative torque corresponding to the brake operation amount to the requested torque corresponding to the accelerator position, and inputs the lower limit rotational speed computation motor torque to the lower limit rotational speed computation unit 49.

Figure 6:
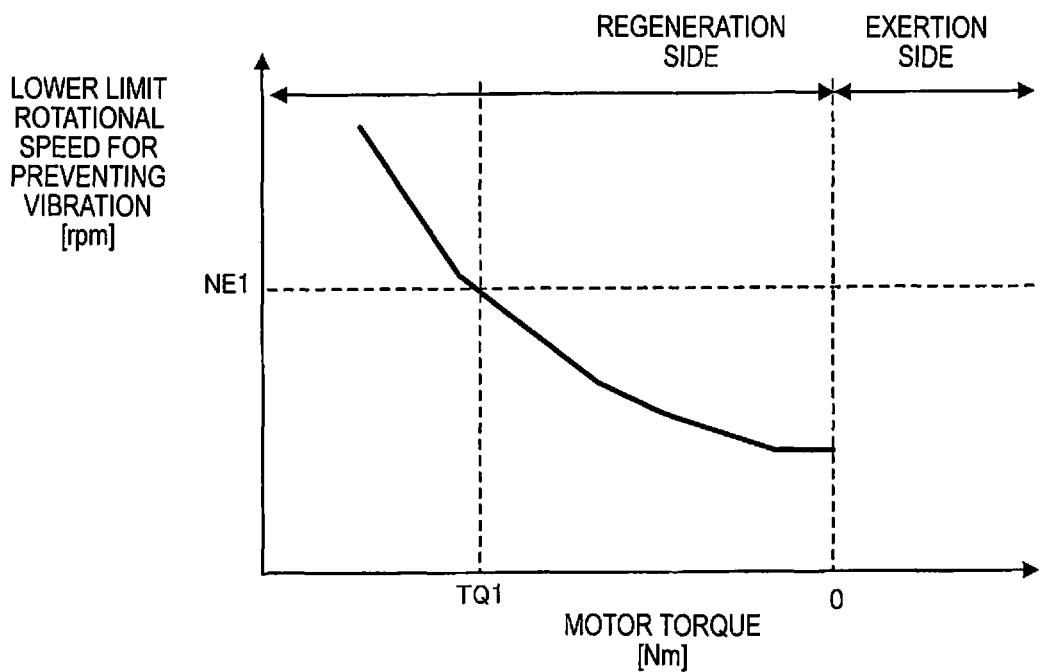
FIG. 6 is an example of a table used in calculating a lower limit rotational speed.

The lower limit rotational speed computation unit 49 calculates a lower limit rotational speed using the lower limit rotational speed computation motor torque. Specifically, this calculation is performed using a table in which the relationship between the motor torque and the lower limit rotational speed is specified, such as is shown in, e.g., FIG. 6. For example, when the lower limit rotational speed computation motor torque is TQ1, the lower limit rotational speed is NE1.

The requested rotational speed computation unit 50 determines a requested rotational speed based on of the upper limit rotational speed, which is restricted for the purposes of the catalyst warm-up mode, etc., and the lower limit rotational speed calculated by the lower limit rotational speed computation unit 49. Because exhaust performance is prioritized over floor vibration, the upper limit rotational speed is prioritized over the lower limit rotational speed. Specifically, when the upper limit rotational speed is lower than the lower limit rotational speed, the upper limit rotational speed is employed as the requested rotational speed. The requested rotational speed is inputted to the electric power generation motor controller 32 and the requested engine torque computation unit 51.

The requested engine torque computation unit 51 calculates engine torque that corresponds to the inputted requested rotational speed and inputs the calculated engine torque to the engine controller 31.

As described above, in the present embodiment, the torque of the drive motor 4 and the rotational speed of the internal combustion engine 2 are restricted using the overall regenerative torque. The vehicle 1 in the present embodiment is a front-wheel-drive vehicle, and the overall regenerative torque is regenerative torque produced by front wheels.

Should the vehicle 1 be a four-wheel-drive vehicle, a total regenerative torque of front and rear wheels would be the overall regenerative torque. The floor vibration that is addressed as a problem in the present embodiment is generated due to the engine mount 7 being compressed as a result of the motor torque generated by the front wheels and due to an increase in a characteristic frequency of a vibration system, in which the internal combustion engine 2 is a rigid body; therefore, in a four-wheel-drive vehicle as well, the restrictions described above presumably should be made using the motor torque of the front wheels. However, in the case of a four-wheel-drive vehicle, torque distribution to front and rear wheels may change, and there is a concern that a sense of discomfort could be imparted to the driver if the engine rotational speed changes each time the torque distribution changes. Thus, in the case of a four-wheel-drive vehicle as described above, the total regenerative torque of the front and rear wheels would be the overall regenerative torque.

The abovementioned restrictions on regenerative torque are limited to times during deceleration when the advancement position is selected and the accelerator position is at zero. This limitation is applied for the following reasons. In cases where the advancement range is selected and the accelerator pedal is depressed, i.e., cases where there is an acceleration request, the engine rotational speed increases in accordance with the acceleration request, whereby it is possible to avoid conditions under which floor vibration increases. During deceleration when the reverse position is selected and the accelerator position is in a zero state, a motor torque requested value is inherently low, wherefore the conditions under which floor vibration increases are not met. Moreover, in cases where the reverse position is selected and the accelerator pedal is depressed, drive force performance will be prioritized even if the conditions under which floor vibration increases are met.

Figure 7:
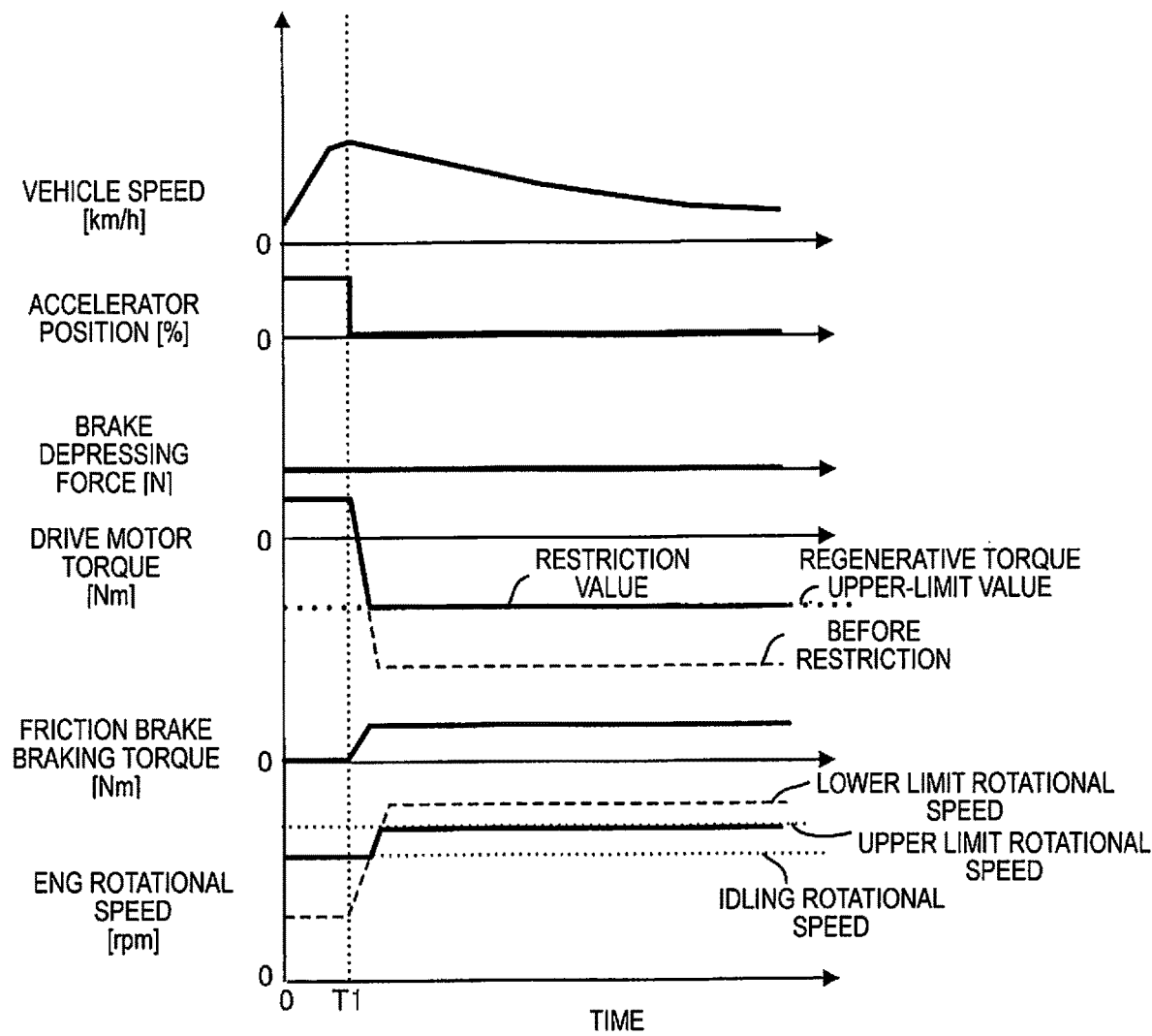
FIG. 7 is an example of a timing chart for a case where a control according to the present invention is executed.

FIG. 7 is an example of a timing chart for a case where the control described above is executed. In this instance, it is assumed that the upper limit of the engine rotational speed is restricted according to the heat protection mode. It is also assumed that the brake pedal is not depressed.

When the accelerator position reaches zero and deceleration is started at a timing T1, the requested torque of the drive motor 4 decreases as indicated by a dashed line in the drawing ("before restriction" in the drawing). Specifically, the requested regenerative torque increases. In cases where the requested torque before restriction is generated, it is necessary to increase the engine rotational speed of the internal combustion engine 2 to a lower limit rotational speed (dashed line in the drawing) in order to suppress floor vibration. However, because the heat protection mode continues to be executed, the engine rotational speed is restricted to an upper limit rotational speed that is lower than the lower limit rotational speed. Therefore, in the present embodiment, the engine rotational speed is restricted to the upper limit rotational speed. As a result, the engine rotational speed is as shown by the solid line in the drawing.

In order to suppress any increase in floor vibration in a state where the engine rotational speed is restricted, the regenerative torque of the drive motor 4 is restricted by a regenerative torque upper limit value (dotted line in the drawing). As a result, the regenerative torque is as shown by the solid line in the drawing.

Furthermore, braking force that decreases due to the regenerative torque being restricted is supplemented by the friction brake.

This makes it possible to suppress any increase in floor vibration while carrying out cooperative regenerative braking even during execution of the heat protection mode.

In the present embodiment as described above, there is provided a method for controlling a series hybrid vehicle, the control method involving controlling a series hybrid vehicle in which the drive motor 4 and the internal combustion engine 2 are supported in a vehicle body via a plurality of mount members in an integrated state, wherein a controller 30: causes the electric power generation motor 3 to generate electric power, the electric power generation motor 3 being driven by motive power of the internal combustion engine; actuates the drive motor 4 by using the generated electric power and drives the drive wheels 6; and causes the drive motor 4 to generate regenerative torque that corresponds to a deceleration request during deceleration. In this control method, the regenerative torque is generated by the drive motor 4 such that an upper limit of the regenerative torque is restricted to a magnitude at which a floor vibration generation region, which is an engine rotational speed region where resonance occurs on the vehicle body floor and is determined based on the upper limit of the regenerative torque, is lower than an engine rotational speed of the internal combustion engine 2 when the electric power generation motor 3 generates the electric power in a state where the regenerative torque is generated. Specifically, the upper limit of the regenerative torque is restricted so that the floor vibration generation region established based on of the upper limit of the regenerative torque, the region being an engine rotational speed region in which resonance of the vehicle body floor is produced, is lower than the engine rotational speed of the internal combustion engine 2 when the electric power generation motor 3 is generating electric power in a state where the regenerative torque is being generated, such that the regenerative torque is generated by the drive motor 4. This makes it possible to prevent the floor vibration from increasing to an impermissible magnitude even when cooperative regenerative braking is executed in a case where the internal combustion engine 2 is operating in order to generate electric power.

In the present embodiment, a calculation is made of a spring constant k of an engine mount 7 for a case in which a combustion excitation force frequency at an upper limit rotational speed of the internal combustion engine 2 during electric power generation and a characteristic frequency of the internal combustion engine 2 elastically supported by the engine mount 7 are equal to each other, a calculation is made of the value of (compression amount of the engine mount 7)×1 when the calculated spring constant k is employed, and the torque of the drive motor 4 when (compression amount)×1 is employed is used as the regenerative torque upper limit value. This makes it possible to set a suitable regenerative torque upper limit value that is appropriate for the characteristics of the spring constant of the engine mount 7.

MODIFICATION

A modification of the embodiment described above is described below. This modification also belongs within the scope of the present invention.

In the embodiment described above, the regenerative torque upper limit value is calculated using the lowest engine rotational speed among upper limit rotational speeds restricted by the regenerative torque upper limit value setting unit 46 according to the catalyst warm-up mode, the recovery mode, and the heat protection mode. By contrast, in the present modification, the regenerative torque upper limit value is calculated using an upper limit rotational speed that corresponds to a travel scenario. For example, in cases where the upper limit rotational speed differs in each of the catalyst warm-up mode, the recovery mode, and the heat protection mode, the upper limit rotational speed for the mode currently being executed is used. There are also instances where, e.g., the upper limit rotational speed changes during execution of the catalyst warm-up mode; in these cases, the current upper limit rotational speed is used. This makes it possible to restrict the regenerative torque and the engine rotational speed as necessary.

Figure 8:
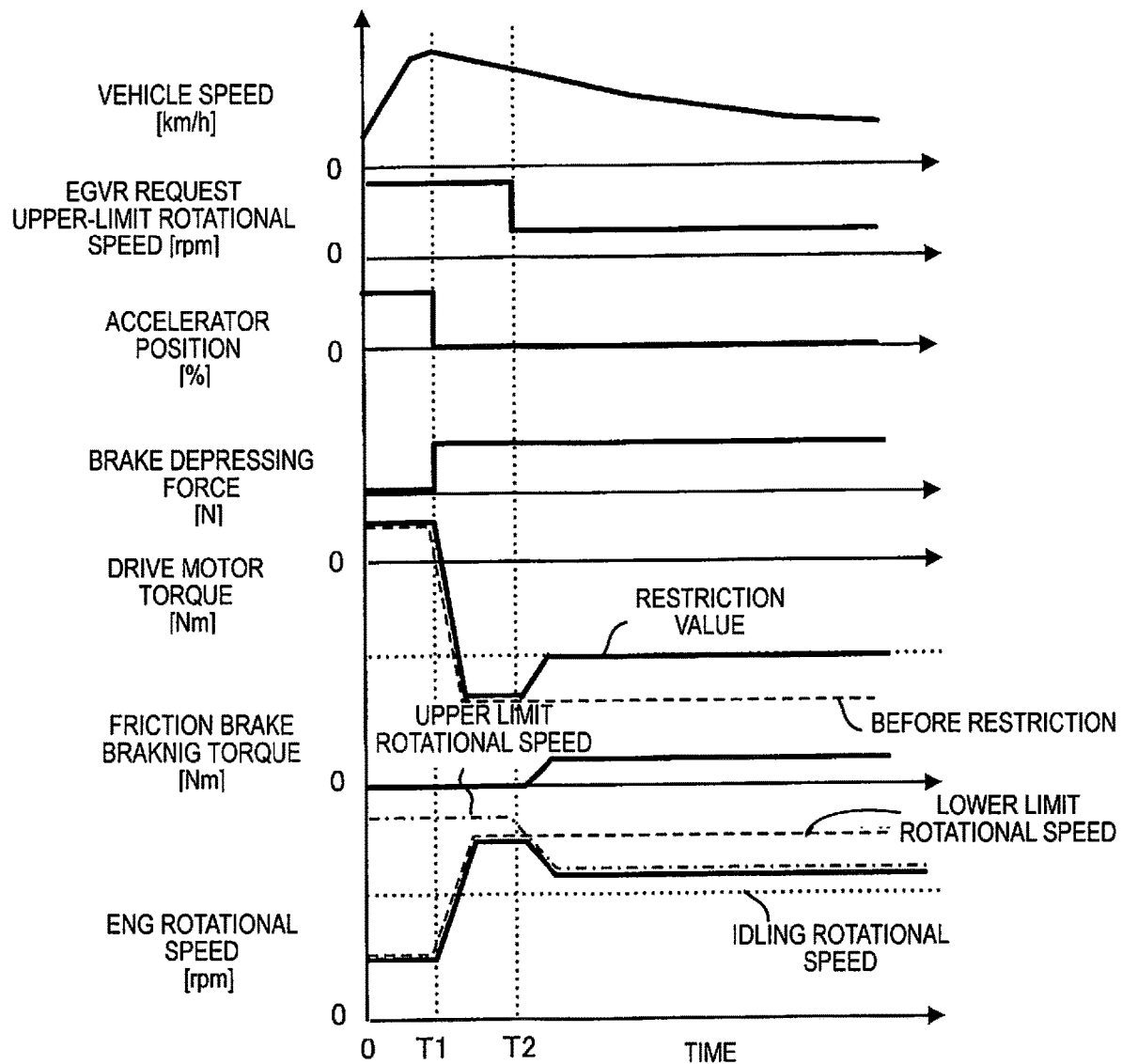
FIG. 8 is a timing chart for a case where a control according to a modification of the present invention is executed.

FIG. 8 is an example of a timing chart for a case where a control according to the modification is executed during deceleration while the catalyst warm-up mode is being executed.

As shown in FIG. 8, the requested value for the upper limit rotational speed during the catalyst warm-up mode (EGVR request upper limit rotational speed in the drawing) decreases at a timing T2. In addition, the upper limit rotational speed is higher than the lower limit rotational speed until the timing T2, and the upper limit rotational speed corresponding to the EGVR request upper limit speed subsequent to the timing T2 is less than the lower limit rotational speed.

According to the present modification, because the engine rotational speed can be raised to the lower limit rotational speed while the upper limit rotational speed is higher than the lower limit rotational speed, it is possible to compensate for the braking force that corresponds to the brake operation amount using the regenerative torque of the drive motor 4. However, when the upper limit rotational speed is lower than the lower limit rotational speed, the engine rotational speed is restricted to the upper limit rotational speed that is lower than the lower limit rotational speed, and as a result the regenerative torque of the drive motor 4 is also restricted. The braking force produced through cooperative regeneration is thus lacking, and therefore the braking force is supplemented by the friction brake.

Thus, in the present modification, the upper limit value of the regenerative torque of the drive motor 4 decreases as the upper limit of the engine rotational speed decreases. Specifically, the upper limit value of the regenerative torque approaches zero as the upper limit of the engine rotational speed decreases. Thus, even when the extent of the restriction on the regenerative torque changes during deceleration, this change is not manifested in the behavior of the vehicle 1, and therefore no sense of discomfort is imparted to the driver.

Although an embodiment of the present invention is described above, this embodiment merely illustrates a portion of an application example of the present invention, and is not intended to limit the technical scope of the present invention to the specific configuration in the embodiment described above.

The invention claimed is:

1. A control method for controlling a series hybrid vehicle having a drive motor and an internal combustion engine supported in a vehicle body via a plurality of mount members in an integrated state, the method using a controller and comprising:

driving an electric power generation motor by motive power of the internal combustion engine to generate electric power by the electric power generation motor;

controlling the internal combustion engine such that an engine rotational speed of the internal combustion engine is equal or smaller than an upper limit rotational speed;

using the electric power generated to drive the drive motor to drive a drive wheel;

generating a regenerative torque by the drive motor in response to a deceleration request during deceleration; and restricting the regenerative torque such that the regenerative torque does not exceed a regenerative torque upper limit value when the drive motor generates the regenerative torque in response to the deceleration request while the electric power generation motor is driven by the internal combustion engine, the regenerative torque upper limit value being calculated such that the regenerative torque is restricted to a magnitude at which a floor vibration generation region is lower than the upper limit rotational speed of the internal combustion engine, the floor vibration generation region being a region of engine rotational speeds at which resonance occurs in a floor of the vehicle body, the floor vibration generation region varying according to the regenerative torque.

2. The series hybrid vehicle control method according to claim 1, further comprising calculating a spring constant of an engine mount, which is one of the plurality of mount members, for a case where a combustion excitation force frequency at an upper limit rotational speed of the internal combustion engine during generation of the electric power and a characteristic frequency of the internal combustion engine elastically supported by the engine mount are equal;

calculating a compression amount of the engine mount when the calculated spring constant is employed; and setting a torque of the drive motor when the compression amount is employed as the regenerative torque upper limit value.

3. The series hybrid vehicle control method according to claim 2, wherein the regenerative torque upper limit value is reduced as the upper limit rotational speed decreases.

4. The series hybrid vehicle control method according to claim 2, wherein the compression amount of the engine mount increases as the regenerative torque increases; and the floor vibration generation region becomes a higher engine rotational speed region as the compression amount of the engine mount increases.

5. A series hybrid vehicle comprising:

an internal combustion engine;

an electric power generation motor that is driven by motive power of the internal combustion engine;

a drive motor that is driven by electric power generated by the electric power generation motor; and a controller that controls the internal combustion engine such that an engine rotational speed of the internal combustion engine is equal or smaller than an upper limit rotational speed and controls the drive motor to generate regenerative torque in response to a deceleration request during deceleration, the drive motor and the internal combustion engine being supported in a vehicle body via a plurality of mount members in an integrated state, the controller being configured to restrict the regenerative torque such that the regenerative torque does not exceed a regenerative torque upper limit value when the drive motor generates the regenerative torque in response to the deceleration request while the electric power generation motor is driven by the internal combustion engine, the controller being configured to calculate the regenerative torque upper limit value such that the regenerative torque is restricted to a magnitude at which a floor vibration generation region is lower than the upper limit rotational speed of the internal combustion engine, the floor vibration generation region being a region of engine rotational speeds at which resonance occurs in a floor of the vehicle body, the floor vibration generation region varying according to the regenerative torque.

6. The series hybrid vehicle according to claim 5, wherein the controller if further configured to:

control the internal combustion engine such that the engine rotational speed is equal to or larger than a lower limit rotational speed; and increase the lower limit rotational speed when the drive motor generates the regenerative torque in response to the deceleration request while the electric power generation motor is driven by the internal combustion engine.

7. The series hybrid vehicle according to claim 6, wherein the controller is further configured to give priority to controlling the internal combustion engine such that the engine rotational speed is equal to or smaller than the upper limit rotational speed when the upper limit rotational speed is equal to or smaller than the lower limit rotational speed.

8. The series hybrid vehicle control method according to claim 1, further comprising:

controlling the internal combustion engine such that the engine rotational speed is equal to or larger than a lower limit rotational speed; and increasing the lower limit rotational speed when the drive motor generates the regenerative torque in response to the deceleration request while the electric power generation motor is driven by the internal combustion engine.

9. The series hybrid vehicle control method according to claim 8, further comprising:

giving priority to controlling the internal combustion engine such that the engine rotational speed is equal to or smaller than the upper limit rotational speed when the upper limit rotational speed is equal to or smaller than the lower limit rotational speed.

* * * * *